(12) United States Patent
Takeishi

(10) Patent No.: US 12,548,381 B2
(45) Date of Patent: Feb. 10, 2026

(54) INFORMATION PROCESSING APPARATUS AND METHOD FOR IMPROVING TRAVEL MaaS

(71) Applicant: TOYOTA JIDOSHA KABUSHIKI KAISHA, Toyota (JP)

(72) Inventor: Hiroki Takeishi, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 18/900,888

(22) Filed: Sep. 30, 2024

(65) Prior Publication Data

US 2025/0131773 A1 Apr. 24, 2025

(30) Foreign Application Priority Data

Oct. 20, 2023 (JP) .................................. 2023-181341

(51) Int. Cl.
*G07C 5/00* (2006.01)
*G07C 5/08* (2006.01)

(52) U.S. Cl.
CPC .............. *G07C 5/006* (2013.01); *G07C 5/004* (2013.01); *G07C 5/0808* (2013.01)

(58) Field of Classification Search
CPC ...... G07C 5/006; G07C 5/004; G07C 5/0808; G07C 5/008; G06Q 30/0645; G06Q 10/04; G06Q 10/20; G06Q 50/40; G06Q 50/43; G01M 17/007
USPC .............................. 701/123, 29.1, 29.4, 29.5
See application file for complete search history.

(56) References Cited

FOREIGN PATENT DOCUMENTS

JP 2019219828 A 12/2019

*Primary Examiner* — Hai H Huynh
(74) *Attorney, Agent, or Firm* — KENJA IP LAW PC

(57) ABSTRACT

An information processing apparatus includes a controller. The controller acquires data on energy efficiency according to a vehicle type of a vehicle upon acquiring data on the vehicle including vehicle type information for the vehicle and data on a remaining energy amount of the vehicle. The controller determines whether maintenance is required for the vehicle based on the data on the remaining energy amount of the vehicle and the energy efficiency.

6 Claims, 4 Drawing Sheets

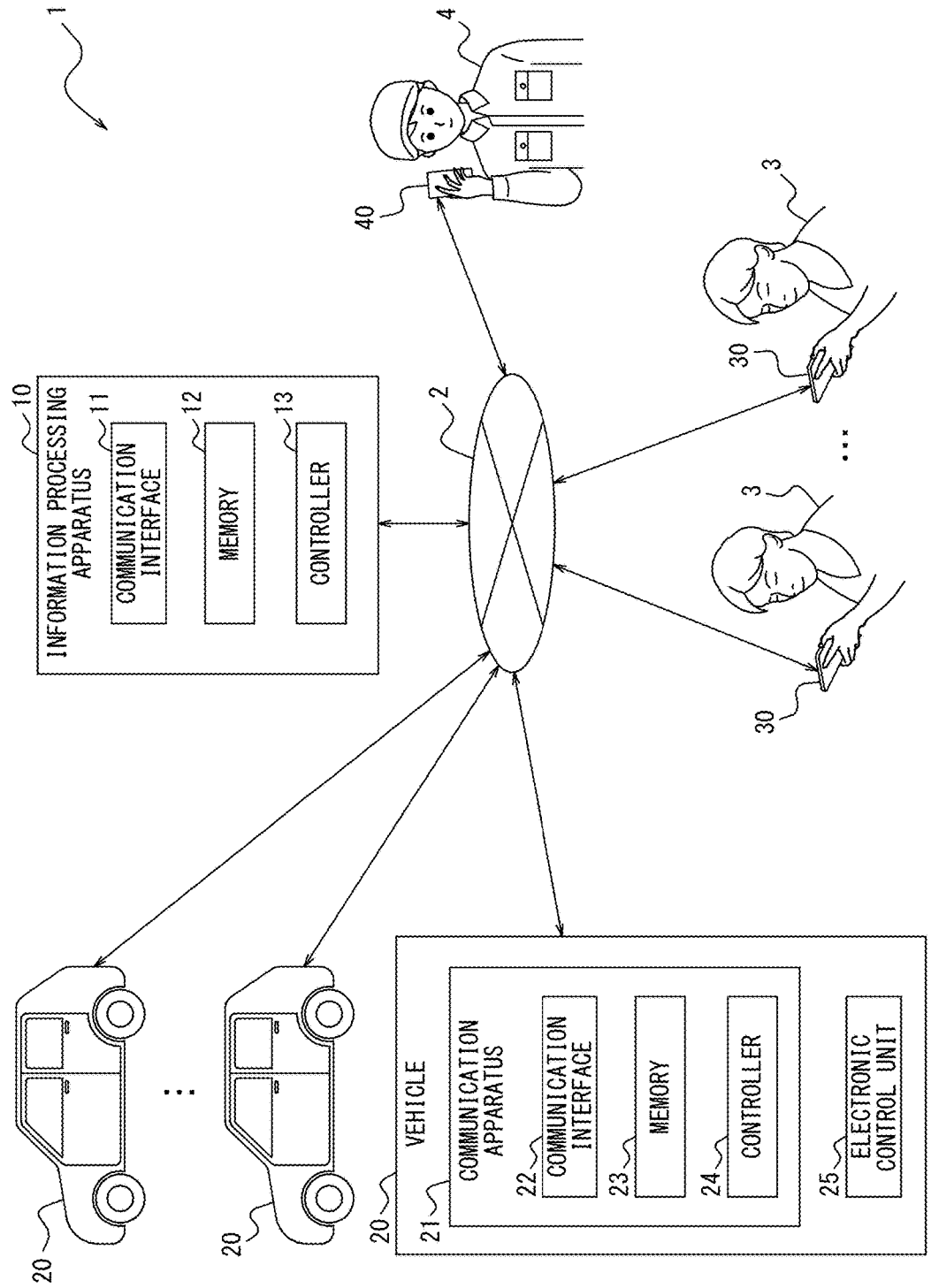

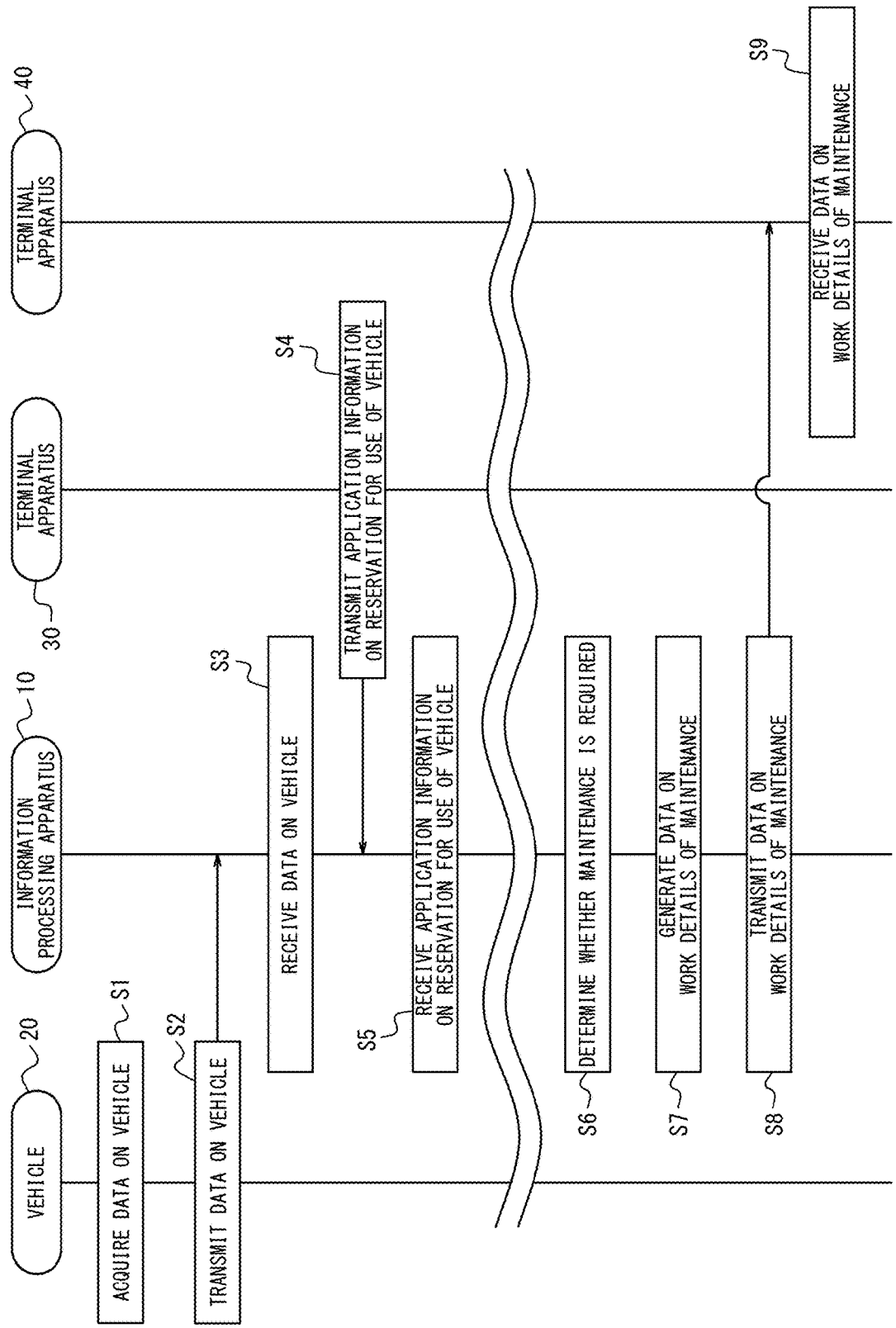

FIG. 3

| DATA ON VEHICLE | |
|---|---|
| VEHICLE TYPE INFORMATION | XXX |
| VEHICLE ID | YYY |
| REMAINING FUEL AMOUNT | 50% |
| STATE OF LIGHTNING OF HEADLIGHTS | OFF STATE |
| STATE OF LIGHTING OF TURN SIGNALS | OFF STATE |
| CONDITION OF ENGINE OIL | GOOD CONDITION |
| INTERIOR CONDITION OF VEHICLE | GOOD CONDITION |
| EXTERIOR APPEARANCE CONDITION OF VEHICLE | GOOD CONDITION |

FIG. 4

| SCHEDULE OF VEHICLE | |
|---|---|
| 9:00 | MAINTENANCE WORK |
| 10:00 | |
| 11:00 | RESERVATION SLOT T1 |
| 12:00 | |
| 13:00 | RESERVATION SLOT T2 |
| 14:00 | |
| 15:00 | |
| ⋮ | ⋮ |

FIG. 5

| VEHICLE ID | WORK DETAILS OF MAINTENANCE |
|---|---|
| ZZZ | REFUELING |
| | TURNING HEADLIGHTS TO OFF STATE |
| | CLEANING INTERIOR OF VEHICLE |
| | WASHING VEHICLE |
| ⋮ | ⋮ |

INFORMATION PROCESSING APPARATUS AND METHOD FOR IMPROVING TRAVEL MaaS

CROSS-REFERENCE TO RELATED APPLICATION

This application claims priority to Japanese Patent Application No. 2023-181341 filed on Oct. 20, 2023, the entire contents of which are incorporated herein by reference.

TECHNICAL FIELD

The present disclosure relates to an information processing apparatus and a method for improving travel MaaS.

BACKGROUND

Services of renting out vehicles such as a car sharing service and a car rental service are known. In these services of renting out vehicles, depending on the condition of the vehicle after being returned, it may be necessary to perform maintenance on the vehicle. Therefore, work is required to determine whether maintenance is required for the vehicle based on the condition of the vehicle after being returned. Increasing the efficiency of this work is important to improve the service efficiency. Thus, Patent Literature (PTL) 1 discloses a car sharing system that checks the appearance of a vehicle based on images captured by a camera.

CITATION LIST

Patent Literature

PTL 1: JP 2019-219828 A

SUMMARY

Some of the items subject to maintenance cannot be determined based on the images. For example, the remaining energy amount of the vehicle or the like cannot be determined based on the images. It would be useful to be able to determine whether maintenance is required for the items that cannot be determined based on the images.

It would be helpful to determine whether maintenance is required for items that cannot be determined based on images.

An information processing apparatus according to an embodiment of the present disclosure includes a controller configured to:
  acquire data on energy efficiency according to a vehicle type of a vehicle upon acquiring data on the vehicle including vehicle type information for the vehicle and data on a remaining energy amount of the vehicle; and
  determine whether maintenance is required for the vehicle based on the data on the remaining energy amount of the vehicle and the energy efficiency.

A method, by a processor, for improving travel mobility as a service (MaaS) according to an embodiment of the present disclosure includes processing steps executed by the information processing apparatus.

According to an embodiment of the present disclosure, it is possible to determine whether maintenance is required for items that cannot be determined based on images.

BRIEF DESCRIPTION OF THE DRAWINGS

In the accompanying drawings:
FIG. 1 is a diagram illustrating a schematic configuration of a system according to an embodiment of the present disclosure;
FIG. 2 is a sequence diagram illustrating an example of a processing procedure of the system illustrated in FIG. 1;
FIG. 3 is a diagram illustrating an example of data on a vehicle;
FIG. 4 is a diagram illustrating an example of a schedule of the vehicle; and
FIG. 5 is a diagram illustrating an example of work details of maintenance.

DETAILED DESCRIPTION

An embodiment of the present disclosure will be described below, with reference to the drawings.
(Configuration of System)

As illustrated in FIG. 1, a system 1 according to the present embodiment includes an information processing apparatus 10, a plurality of vehicles 20, a plurality of terminal apparatuses 30, and a terminal apparatus 40. In the present embodiment, the system 1 includes a plurality of vehicles 20 and a plurality of terminal apparatuses 30. However, the system 1 need only include at least one vehicle 20 and at least one terminal apparatus 30.

The information processing apparatus 10, the vehicles 20, the terminal apparatus 30, and the terminal apparatuses 40 are communicable via a network 2. The network 2 may be any network including a mobile communication network, the Internet, or the like.

The information processing apparatus 10 provides a service of renting out the vehicles 20. In the present embodiment, the information processing apparatus 10 is described as providing a car sharing service as a service for renting out the vehicles 20. However, the service of renting out the vehicles 20 is not limited to car sharing services. As another example, a service that rents out the vehicles 20 may be a car rental service.

The information processing apparatus 10 manages reservation of the vehicles 20 in the car sharing service. The information processing apparatus 10 also determines whether the vehicle 20 requires maintenance. The information processing apparatus 10 is a dedicated computer configured to function as a server, a general purpose personal computer, a cloud computing system, or the like.

The vehicle 20 is a vehicle for rent. The vehicle 20 waits at a standby location when being not rented out. The waiting area is, for example, a parking lot. The waiting area may be unmanned. In other words, the renting and borrowing of the vehicles 20 may take place in an unmanned store.

Each vehicle 20 may be any type of automobile. Each vehicle 20 is, for example, a gasoline vehicle, a diesel vehicle, a hydrogen vehicle, a Fuel Cell Electric Vehicle (FCEV), a Battery Electric Vehicle (BEV), a Hybrid Electric Vehicle (HEV), a Plug-in Hybrid Electric Vehicle (PHEV), or the like.

The terminal apparatuses 30 are used by users 3. When the users 3 want to rent the vehicles 20, they make reservations for use of the vehicles 20 using the terminal apparatuses 30. Each of the terminal apparatuses 30 is, for example, a smartphone, a tablet terminal, a notebook personal computer (PC), a desktop PC, or the like.

The terminal apparatus 40 is used by a worker 4. The worker 4 performs maintenance on the vehicle 20 when the vehicle 20 is waiting in the waiting area. The worker 4 confirms the work details of maintenance using the terminal apparatus 40. The terminal apparatus 40 is, for example, a smartphone, a tablet terminal, a notebook PC, a desktop PC, or the like.

(Configuration of Information Processing Apparatus)

The information processing apparatus 10 includes a communication interface 11, a memory 12, and a controller 13.

The communication interface 11 is configured to include at least one communication module for connection to the network 2. For example, the communication module is a communication module compliant with a standard such as a wired Local Area Network (LAN) or a wireless LAN. The communication interface 11 is connectable to the network 2 via a wired LAN or a wireless LAN using the communication module.

The memory 12 is configured to include at least one semiconductor memory, at least one magnetic memory, at least one optical memory, or a combination of at least two of these. The semiconductor memory is, for example, random access memory (RAM) or read only memory (ROM). The RAM is, for example, static random access memory (SRAM), dynamic random access memory (DRAM), or the like. The ROM is, for example, Electrically Erasable Programmable Read Only Memory (EEPROM) or the like. The memory 12 may function as a main memory, an auxiliary memory, or a cache memory. The memory 12 stores data to be used in the operations of the information processing apparatus 10 and data obtained by the operations of the information processing apparatus 10. For example, the memory 12 stores the data on energy efficiency described below for each vehicle type of the vehicles 20.

The controller 13 is configured to include at least one processor, at least one dedicated circuit, or a combination thereof. The processor is, for example, a general purpose processor such as a Central Processing Unit (CPU) or a Graphics Processing Unit (GPU), or a dedicated processor that is dedicated to a specific process. Examples of dedicated circuits can include a Field-Programmable Gate Array (FPGA) and an Application Specific Integrated Circuit (ASIC). The controller 13 executes processes related to the operations of the information processing apparatus 10 while controlling the components of the information processing apparatus 10.

(Configuration of Vehicle)

The vehicle 20 is equipped with a communication apparatus 21 and an electronic control unit 25. The communication apparatus 21 includes a communication interface 22, a memory 23, and a controller 24.

The communication interface 22 is configured to include at least one communication module for connection to the network 2. The communication module is a communication module compliant with a mobile communication standard such as Long Term Evolution (LTE), 4th Generation (4G), or 5th Generation (5G).

The memory 23 is configured to include at least one semiconductor memory, at least one magnetic memory, at least one optical memory, or a combination of at least two of these. The configuration of the memory 23 may be the same or similar to the configuration of the memory 12. The memory 23 may function as a main memory, an auxiliary memory, or a cache memory. The memory 23 stores data to be used for the operations of the communication apparatus 21 and data obtained by the operations of the communication apparatus 21. For example, vehicle type information for the vehicle 20 is stored in the memory 23.

The controller 24 is configured to include at least one processor, at least one dedicated circuit, or a combination thereof. The configuration of the controller 24 may be the same or similar to that of the controller 13. The controller 24 executes processes related to operations of the communication apparatus 21 while controlling components of the communication apparatus 21.

The electronic control unit 25 is an Electronic Control Unit (ECU) of the vehicle 20. The electronic control unit 25 controls various functions of the vehicle 20.

(Operations of System)

FIG. 2 is a sequence diagram illustrating an example of operations of the system 1 illustrated in FIG. 1.

The S1 process is performed by the communication apparatus 21 of the vehicle 20. The controller 24 of the communication apparatus 21, for example, performs the S1 process when the vehicle 20 is returned.

In the S1 process, the controller 24 first acquires data on the vehicle 20 by communicating with the electronic control unit 25 and retrieving information from the memory 23. The data on the vehicle 20 includes vehicle type information for the vehicle 20 and the remaining energy amount of the vehicle 20. The data on the vehicle 20 may further include at least any of the following: the state of lighting of the lighting device of the vehicle 20, the condition of the consumable items of the vehicle 20, the interior condition of the vehicle 20, and the exterior appearance condition of the vehicle 20.

The remaining energy amount of the vehicle 20 is the amount of energy remaining to power the vehicle 20. For example, if the vehicle 20 is a fuel-powered gasoline, diesel, hydrogen, or FCEV, the controller 24 acquires data on the remaining fuel amount of the vehicle 20 as the remaining energy amount of the vehicle 20. If the vehicle 20 is a BEV powered by electricity, the controller 24 acquires data on the remaining battery capacity of the vehicle 20 as the remaining energy amount.

The lighting device of the vehicle 20 includes, for example, at least any of the following: headlights, small lights, blinkers, fog lights, back-up lights, and brake lights. The state of lighting of a lighting device is, for example, any of the on state indicating that the lighting device is on and the off state indicating that the lighting device is off.

The consumable items of the vehicle 20 are parts that wear out as the vehicle 20 is driven. The consumable items of the vehicle 20 include, for example, at least any of the following: engine oil, oil filter, air element, battery, long-life coolant, brake fluid, brake pads, tires, spark plugs, and window washer fluid. The condition of a consumable item in a vehicle 20 is, for example, either a good condition, indicating that the consumable item is in a favorable condition, or a bad condition, indicating that the consumable item is in an unfavorable condition. Consumable items need to be replaced when they are in bad conditions. The condition of the consumable item of the vehicle 20 may be stored in the memory 23 based on the operation input of the worker 4 when the worker 4 performs maintenance on the vehicle 20, or it may be stored in the memory 23 based on the user 3's input when the user 3 uses the vehicle 20.

The interior condition of a vehicle 20 is the dirt condition of the interior of the vehicle 20. The interior condition of the vehicle 20 can be either a good condition, indicating that the interior is clean, or a bad condition, indicating that the interior is dirty. The interior condition of the vehicle 20 may be stored in the memory 23 based on the user 3's operational input when the user 3 returns the vehicle 20.

The exterior appearance condition of the vehicle 20 is the condition of dirt on the exterior appearance of the vehicle 20. The exterior appearance condition of the vehicle 20 can be either a good condition, indicating a clean exterior, or a bad condition, indicating a dirty exterior.

For example, data on the vehicles 20 as illustrated in FIG. 3 is acquired. In the configuration illustrated in FIG. 3, the power source for the vehicle 20 is fuel. Therefore, data on the remaining fuel amount is acquired as the remaining energy amount. In FIG. 3, the state of lighting of the headlights and the state of lighting of turn signals are acquired as the state of lighting of the lighting device of the vehicle 20. In addition, the condition of the engine oil is acquired as the condition of the consumable items of the vehicle 20.

Here, as illustrated in FIG. 3, the data on the vehicle 20 may further include the vehicle ID. The vehicle ID is identification information of the vehicle 20 that can uniquely identify the vehicle 20. The vehicle ID can be used to identify the vehicle type of the vehicle 20. Thus, the data on the vehicle 20 may include vehicle ID data instead of vehicle type information for the vehicle 20. In this case, the vehicle ID data may be considered as vehicle type information for the vehicles 20.

In the process of S2, the controller 24 controls the communication interface 22 to transmit the data on the vehicle 20 acquired in the process of S1 to the information processing apparatus 10 via the network 2.

The processes in S1 and S2 may be repeated by different vehicles 20.

In the process of S3, the controller 13 of the information processing apparatus 10 controls the communication interface 11 to receive the data on the vehicle 20 from the vehicle 20 via the network 2. The controller 13 stores the received data on the vehicle 20 in the memory 12.

In the S4 process, the terminal apparatus 30 accepts input of application information on a reservation for use of the vehicle 20 from the user 3. The application information on the reservation for use of the vehicle 20 includes information on a reservation slot. The reservation slot is the time from the start time when the use of the vehicles 20 begins to the end time when the use of the vehicles 20 ends. The terminal apparatus 30 transmits the application information on the reservation for use of the vehicle 20 received from the user 3 to the information processing apparatus 10 via the network 2.

The process of S4 may be repeated by different terminal apparatus 30.

In the process of S5, the controller 13 of the information processing apparatus 10 receives, through the communication interface 11, the application information on the reservation for use of the vehicle 20 from the terminal apparatus 30 via the network 2. The controller 13 accepts the reservation for use of the vehicle 20 by receiving the application information on the reservation for use of the vehicle 20. The controller 13 generates or updates schedule information for the vehicle 20 by accepting the reservation for use of the vehicle 20. The schedule information for the vehicle 20 includes information on the reservation slot and the time when the maintenance of the vehicle 20 is to be performed. The controller 13 stores the generated schedule information for the vehicle 20 in the memory 12.

The process of S6 is executed by the information processing apparatus 10 at a predetermined time. The predetermined time may be based on the time of day when maintenance is performed. For example, if maintenance is performed during the early morning hours, the predetermined time may be midnight.

In the process of S6, the controller 13 refers to the vehicle type information for the vehicle 20 stored in the memory 12 and acquires the data on energy efficiency according to the vehicle type of the vehicle 20. The energy efficiency of the vehicle 20 is, for example, data on the travelable distance for the vehicle 20 per unit energy. If the vehicle 20 is fuel powered, the controller 13 acquires data on the travelable distance for the vehicle 20 per unit fuel as data on energy efficiency corresponding to the vehicle type of the vehicle 20. Hereafter, data on the travelable distance per unit fuel will also be described as "fuel economy". When the vehicle 20 is powered by electricity, the controller 13 acquires data on the travelable distance for the vehicle 20 per unit electricity as data on energy efficiency corresponding to the vehicle type of the vehicle 20. Hereafter, the data on the travelable distance per unit electricity will also be described as "electricity economy".

Once the controller 13 acquires the data on energy efficiency, it calculates the travelable distance for the vehicle 20 based on the data on the remaining energy amount of the vehicle 20 and the energy efficiency.

When the controller 13 calculates the travelable distance for the vehicle 20, it acquires information on a plurality of reservation slots for the vehicle 20 on a given day. The predetermined date is, for example, the next day. For example, the controller 13 retrieves the schedule information for the vehicle 20, as illustrated in FIG. 4, from the memory 12. The schedule information as illustrated in FIG. 4 includes information on reservation slots T1 and T2 and the time period during which maintenance is to be performed, from 9:00 to 10:00. In reservation slot T1, the start time is 10:30 and the end time is 12:00. In reservation slot T2, the start time is 12:30 and the end time is 15:00.

When the controller 13 acquires information on a plurality of reservation slots for the vehicle 20, it estimates the usage status of the vehicle 20 in each of the plurality of reservation slots. In the present embodiment, the controller 13 estimates a scheduled travel distance for the vehicle 20 as the usage status of the vehicle 20. The controller 13 may estimate the scheduled travel distance for the vehicle 20 in the reservation slot based on the past usage status of the vehicle 20 by the user 3 who reserved the reservation slot. Alternatively, the controller 13 may estimate that the longer the reservation slot, the longer the scheduled travel distance for the vehicle 20.

The controller 13 determines whether the vehicle 20 requires maintenance based on the estimated usage status of the vehicle 20. In the present embodiment, the controller 13 calculates the total scheduled distance for the vehicle 20 by adding up the scheduled travel distance for the vehicle 20 in each of the plurality of reservation slots. The total scheduled distance for the vehicles 20 to be calculated is the total of the scheduled travel distances for the vehicle 20 on a given day. If the calculated total scheduled distance for the vehicle 20 is greater than or equal to the travelable distance for the vehicle 20, the controller 13 determines that energy supply to the vehicle 20 is required as maintenance. On the other hand, if the calculated total scheduled distance for the vehicle 20 is less than the travelable distance for the vehicle 20, the controller 13 determines that energy supply to the vehicle 20 is not required as maintenance. In the configuration illustrated in FIG. 4, the controller 13 determines that the calculated total scheduled distance for the vehicle 20 is greater than or equal to the travelable distance for the vehicle 20 and that energy supply to the vehicle 20 is required as maintenance.

In the process of S6, the controller 13 may determine whether maintenance is required for the lighting device based on the state of lighting of the lighting device included in the data on the vehicle 20. As an example, the controller 13 determines that if the state of lighting of a lighting device is the on state, maintenance is required to turn the lighting device to the off state. On the other hand, the controller 13 determines that maintenance is not required when the state of lighting of the lighting device is the off state.

In the S6 process, the controller 13 may determine whether maintenance of the consumable item is required based on the condition of the consumable item included in the data on the vehicle 20. As an example, if the condition of the consumable item is a bad condition, the controller 13 determines that maintenance is required to replace the consumable item. On the other hand, if the condition of the consumable item is a good condition, the controller 13 determines that maintenance is not required.

In the process of S6, the controller 13 may determine whether maintenance is required for the vehicle 20 based on the interior condition of the vehicle 20 contained in the data on the vehicle 20. As an example, the controller 13 determines that maintenance is required to clean the interior of the vehicle 20 if the interior condition of the vehicle 20 is a bad condition. On the other hand, the controller 13 determines that maintenance is not required when the interior condition of the vehicle 20 is a good condition.

In the process of S6, the controller 13 may determine whether maintenance is required for the vehicle 20 based on the exterior appearance condition of the vehicle 20 included in the data on the vehicle 20. As an example, the controller 13 determines that maintenance is required to wash the vehicle 20 if the exterior appearance condition of the vehicle 20 is a bad condition. On the other hand, the controller 13 determines that maintenance is not required if the exterior appearance condition of the vehicle 20 is a good condition.

In the S7 process, the controller 13 generates data on the work details of maintenance based on the judgment result of S6. As an example, if the controller 13 determines that energy supply to the vehicle 20 is required as maintenance in the S6 process, energy supply is added to the work details of maintenance. If the controller 13 determines that maintenance of lighting device, etc. is necessary in the process of S6, it adds maintenance of lighting device, etc. to the work details.

For example, the controller 13 generates data on work details of maintenance as illustrated in FIG. 5. In FIG. 5, the vehicles 20 for which maintenance is performed are identified by a vehicle ID. In FIG. 5, the work details of maintenance for the vehicle 20, whose vehicle ID is ZZZZ, include refueling as energy supply, turning the headlights to the off state, cleaning the interior and washing the car.

In the process of S8, the controller 13 controls the communication interface 11 to transmit the data on work details of maintenance generated in the process of S7 to the terminal apparatus 40 via the network 2.

In the process of S9, the terminal apparatus 40 receives data on work details of maintenance from the information processing apparatus 10 via the network 2. The terminal apparatus 40 displays data on work details of maintenance. The worker 4 checks the work details of maintenance displayed on the terminal apparatus 40 and performs maintenance on the vehicle 20.

Here, the timing at which the S6 process is executed is not limited to a predetermined time. As another example, the controller 13 may perform the process of S6 each time the process of S3 is performed, i.e., each time the data on the vehicle 20 data is received. Another example of the process of S6 is described below.

Other Example of Process of S6

When the controller 13 receives the data on the vehicle 20 in the S3 process, it executes the S6 process. First, the controller 13 refers to the vehicle type information for the vehicle 20 stored in the memory 12 and acquires the data on energy efficiency according to the vehicle type of the vehicle 20, in the same or similar process as described above. Once the controller 13 acquires the data on energy efficiency, it calculates the travelable distance for the vehicle 20 based on the data on the remaining energy amount of the vehicle 20 and the energy efficiency, in the same or similar process as described above.

The controller 13 determines whether energy supply to the vehicle 20 is required as maintenance based on data on the calculated travelable distance for the vehicle 20. As an example, the controller 13 determines that energy supply to the vehicle 20 is required as maintenance if the calculated travelable distance for the vehicle 20 is below the distance threshold. If the calculated travelable distance for the vehicle 20 is greater than or equal to the distance threshold, the controller 13 determines that energy supply to the vehicle 20 is not required as maintenance. The distance threshold may be set in consideration of how the vehicle 20 is used.

If the controller 13 determines that energy supply to the vehicle 20 is required as maintenance, it may send instructions to the terminal apparatus 40 via the network 2 to supply the energy to the vehicle 20 by the communication interface 11. When the terminal apparatus 40 receives this instruction from the information processing apparatus 10 via the network 2, it may display instructions to supply energy to the vehicle 20. With this configuration, the worker 4 can go to the waiting area where the vehicle 20 is waiting and supply energy to the vehicle 20.

In addition, the controller 13 may determine whether maintenance of the lighting device is required based on the state of lighting of the lighting device, in the same or similar process as described above. In the same or similar process as described above, the controller 13 may also determine whether maintenance of consumable items is required based on the condition of the consumable items. If the controller 13 determines that maintenance of the state of lighting of lighting devices and/or the consumable items is required, maintenance instructions may be transmitted by the communication interface 11 to the terminal apparatus 40 via the network 2. For example, the controller 13 may send a maintenance instruction to the terminal apparatus 40 to turn the lighting device to the off state if the state of lighting of the lighting device is in the on state. When the terminal apparatus 40 receives a maintenance instruction from information processing apparatus 10 via the network 2, it may display the maintenance instruction. This configuration allows, for example, the lighting device to be turned to the off state by the worker 4, even if the user 3 returns the vehicle 20 with the lighting device in the on state.

Thus, in the information processing apparatus 10 according to the present embodiment, the controller 13 determines whether maintenance is required for the vehicle 20 based on the data on the remaining energy amount of the vehicle 20 and the energy efficiency. The remaining energy amount of the vehicle 20 cannot be determined based on the image. Therefore, according to the present embodiment, it is possible to determine whether maintenance is required for items that cannot be determined based on the image.

Furthermore, in the information processing apparatus 10 of the present embodiment, the controller 13 may acquire information on a plurality of reservation slots for the vehicle 20 and estimate the corresponding usage status of the vehicle 20 in each of the plurality of reservation slots. The controller 13 may determine whether maintenance is required for the vehicle 20 based on the estimated usage status of the vehicle 20. Here, when the vehicles 20 are rented or borrowed in a car sharing service at an unmanned store, maintenance of the vehicles 20 may only be possible during limited hours of the day (e.g., morning hours). In this case, depending on the daily usage status of the vehicles 20, the remaining energy amounts of the vehicles 20 at the time maintenance can be performed may not last until the last reservation slot of the day. In the present embodiment, the controller 13 determines whether maintenance is required for the vehicle 20 based on the estimated usage status of the vehicle 20, thereby avoiding a situation in which the vehicle 20's energy does not last until the last reservation slot of the day.

In the information processing apparatus 10 of the present embodiment, the controller 13 may also determine whether maintenance of lighting devices or consumable items is required based on the state of lighting of the lighting devices or the condition of the consumable items of the vehicle 20. Here, the state of lighting of the lighting devices and the condition of the consumable items cannot be determined based on the images. In other words, the present embodiment can determine whether maintenance is required for lighting devices and consumable items that cannot be determined based on the images. Information on the state of lighting of lighting devices and the condition of consumable items can be acquired from the electronic control unit 25 of the vehicle 20 without input from the user 3 to the vehicle 20 or other devices. Therefore, it is possible to determine whether maintenance is required without bothering the user 3.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, the information processing apparatus 10 may be used to provide Mobility as a Service (MaaS), a service that leverages mobility. For example, the processing steps as illustrated in FIG. 2 may be executed when providing a service (MaaS) using the vehicles 20. In this case, the information processing method according to the processing steps as illustrated in FIG. 2 is an example of a method of providing a service (MaaS) using the vehicles 20.

For example, in the embodiment described above, it is assumed that the vehicles 20 and the information processing apparatus 10 communicate directly via the network 2. However, the vehicles 20 and the information processing apparatus 10 may communicate via other server apparatus.

The invention claimed is:

1. An information processing apparatus comprising a controller configured to:
   acquire data on energy efficiency according to a vehicle type of a vehicle upon acquiring data on the vehicle including vehicle type information for the vehicle and data on a remaining energy amount of the vehicle; and
   determine whether maintenance is required for the vehicle based on the data on the remaining energy amount of the vehicle and the energy efficiency.

2. The information processing apparatus according to claim 1, wherein the controller is configured to:
   calculate a travelable distance for the vehicle based on the data on the remaining energy amount of the vehicle and the energy efficiency; and
   determine whether energy supply to the vehicle is required as the maintenance based on the calculated travelable distance for the vehicle.

3. The information processing apparatus according to claim 1, wherein the controller is configured to:
   acquire information on a plurality of reservation slots for the vehicle;
   estimate a corresponding usage status of the vehicle in each of the plurality of reservation slots; and
   determine whether the maintenance is required for the vehicle based on the estimated usage status of the vehicle.

4. The information processing apparatus according to claim 1, wherein the data on the energy efficiency according to the vehicle type of the vehicle includes data on a travelable distance for the vehicle per unit fuel or data on a travelable distance for the vehicle per unit electricity.

5. The information processing apparatus according to claim 1, wherein
   the data on the vehicle further includes data on a state of lighting of a lighting device of the vehicle and/or a condition of a consumable item of the vehicle, and
   the controller is configured to determine whether maintenance of the lighting device and/or the consumable item is required based on the state of lighting of the lighting device and/or the condition of the consumable item.

6. A method, by a processor, for improving travel mobility as a service (MaaS), comprising processing steps executed by the information processing apparatus according to claim 1.

* * * * *